United States Patent [19]

Aoki et al.

[11] Patent Number: 5,397,814

[45] Date of Patent: Mar. 14, 1995

[54] RELEASING ORGANOPOLYSILOXANE COMPOSITION COMPRISING (METH)ACRYLIC FUNCTIONAL GROUP-CONTAINING ORGANOPOLYSILOXANES

[75] Inventors: Shunji Aoki; Shinji Irifune; Takafumi Sakamoto, all of Annaka, Japan

[73] Assignee: Shin-Etsu Chemical Co., Ltd., Tokyo, Japan

[21] Appl. No.: 57,387

[22] Filed: May 6, 1993

[30] Foreign Application Priority Data

May 6, 1992 [JP] Japan .................. 4-140971

[51] Int. Cl.$^6$ .......................... C08F 2/46; C08F 130/08
[52] U.S. Cl. ............................. 522/99; 528/32; 428/447
[58] Field of Search .............. 522/99; 528/32; 428/447

[56] References Cited

U.S. PATENT DOCUMENTS

| | | | |
|---|---|---|---|
| 4,348,454 | 9/1982 | Eckberg | 522/99 |
| 5,026,741 | 6/1991 | Arai et al. | 522/99 |

FOREIGN PATENT DOCUMENTS

| | | |
|---|---|---|
| 5231910 | 8/1977 | Japan . |
| 53-36515 | 10/1978 | Japan . |
| 58-53656 | 11/1983 | Japan . |
| 63-135426 | 6/1988 | Japan . |
| 2041389 | 9/1980 | United Kingdom . |

Primary Examiner—Susan W. Berman
Attorney, Agent, or Firm—Lowe, Price, LeBlanc & Becker

[57] ABSTRACT

A radiation-curable, releasing silicone composition which comprises an organopolysiloxane having methacrylic or acrylic functional groups and represented by the following general formula

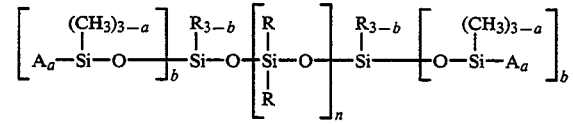

In the formula, A represents a monovalent hydrocarbon group having a methacrylic or acrylic moiety, R's independently represent an unsubstituted or substituted monovalent organic group, a is an integer of 1, 2 or 3, b is an integer of 2 or 3, and n is an integer of 1 or over. The organopolysiloxane has a viscosity of from 50 to 2,000 cps., at 25° C. The composition exhibits good releasing properties with respect to self-adhesives.

30 Claims, No Drawings

RELEASING ORGANOPOLYSILOXANE COMPOSITION COMPRISING (METH)ACRYLIC FUNCTIONAL GROUP-CONTAINING ORGANOPOLYSILOXANES

BACKGROUND OF THE INVENTION

1. Field of the Invention

This invention relates to releasing organopolysiloxane compositions and more particularly, to radiation-curable releasing silicone composition comprising methacrylic or acrylic functional group-containing organopolysiloxanes.

2. Description of the Prior Art

Electron radiation-curable silicone compositions are known, for example, in Japanese Patent Publication No. 52-31910. The composition comprises organopolysiloxanes having a (meth)acryloxy group in the molecule. Japanese Patent Publication No. 53-36515 sets out the composition comprising such organopolysiloxanes as mentioned above, to which sensitizers or photoinitiators are further added. These types of compositions are stated as having more improved radiation curability as the content of the (meth)acryloxy group in the organopolysiloxane becomes larger.

However, when cured, the compositions exhibit a high density of crosslinkage. This undesirably leads to a high hardness of the cured film with the lowering of a release characteristic relative to self-adhesive materials. As a consequence, an abnormally great release force will be undesirably required. In addition, the follow-up action of the cured film on substrates becomes worsened, with the attendant drawback that the film is liable to crack, adversely influencing the release characteristics.

In order to make a cured film whose hardness is low, there has been proposed use of an organopolysiloxane which has one (meth)acrylic group at each terminal end without any (meth)acrylic group being joined to side chains of the siloxane units. However, the cured film obtained from such an organopolysiloxane does not have a low hardness and good releasing properties against self-adhesive substances without a sacrifice of curability.

Preparation of the above type of organopolysiloxane having (meth)acrylic functionality has also been proposed by use of a process of dehydrochlorination from ≡Si—Cl groups and a polyacrylate such as pentaerythritol triacrylate. This process is set forth, for example, in Japanese Patent Publication No. 58-53656. The (meth)acrylic functionality-bearing organopolysiloxane obtained by this process has the siloxane chains and the (meth)acrylic group joined through chemically unstable ≡Si—O—C≡ linkage. This is disadvantageous in that the organopolysiloxane and the cured product obtained therefrom suffer a great change in properties in relation to the time.

Moreover, Japanese Laid-open Patent Application No. 63-135426 has proposed a process of preparing an organopolysiloxane having both (meth)acrylic functionality and epoxy functionality in which an organopolysiloxane having epoxy functionality is first reacted with (meth)acrylic acid and then with (meth)acrylic acid chloride. In order to obtain this type of epoxy functional organopolysiloxane, an organohydrogenpolysiloxane is first prepared, followed by hydrosilylation reaction with an epoxy compound having an alkenyl group in the presence of platinum. Thus, the process undesirably requires multi-stage reactions.

SUMMARY OF THE INVENTION

It is accordingly an object of the invention to provide a radiation-curable releasing silicone composition which overcomes the drawbacks of the prior art and which comprises an organopolysiloxane having at least two methacrylic or acrylic functional groups at each terminal end thereof whereby the composition can be cured to a satisfactory extent with good light-duty release properties.

It is another object of the invention to provide a cured product which is obtained from the composition of the type mentioned above and exhibits good release properties relative to self-adhesives.

According to the present invention, there is provided a radiation-curable releasing silicone composition which comprises an organopolysiloxane having methacrylic or acrylic functionality and represented by the following general formula (1)

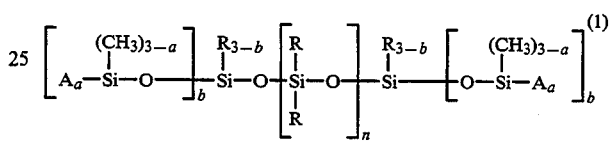

wherein A represents a monovalent hydrocarbon group having a methacrylic or acrylic moiety and having from 4 to 10 carbon atoms, R represents an unsubstituted or substituted monovalent organic group, a is an integer of 1, 2 or 3, b is an integer of 2 or 3, and n is an integer of 1 or over provided that the organopolysiloxane has a viscosity of from 50 to 2,000 cps., at 25° C. In view of the defined viscosity, n is preferably up to several hundreds.

The organopolysiloxane used in the composition of the invention has two or more ≡Si—C type methacrylic or acrylic groups at each end of the organopolysiloxane chain. Accordingly, the organopolysiloxane is radiation-curable and has a low density of crosslinkage when cured. Nevertheless, the curability is not low. The composition of the invention is capable of forming a flexible film on the surface of articles to be applied and such a film exhibits good light-duty release properties particularly with respect to self-adhesives.

DETAILED DESCRIPTION AND EMBODIMENTS OF THE INVENTION

The organopolysiloxane having (meth)acrylic functionalities used in the releasing silicone composition of the invention is of the general formula defined hereinbefore. In the formula, A represents a monovalent group having a methacrylic or acrylic moiety. The monovalent group has from 4 to 10 carbon atoms and is preferably represented by the following formula (2)

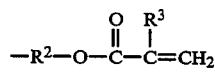

wherein $R^2$ represents an alkyl group having from 1 to 6 carbon atoms, and $R^3$ represents hydrogen or a methyl group. Specific and preferred examples of the units include those groups of the following formulas (3) to (6)

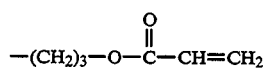 (3)

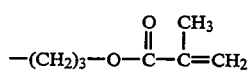 (4)

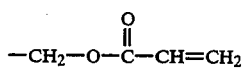 (5)

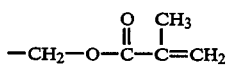 (6)

Each R individually represents an unsubstituted or substituted organic group. Such an organic group includes, for example, an alkyl group having from 1 to 8 carbon atoms such as a methyl group, an ethyl group, a propyl group, a butyl group, a pentyl group, a hexyl group, a heptyl group or an octyl group, an alkenyl group having from 1 to 8 carbon atoms such as a vinyl group, an allyl group or the like, an aryl group such as a phenyl group, a tolyl group or the like, or those groups mentioned above wherein part or all of the hydrogen atoms joined to the carbon atoms of the groups are substituted with a halogen atom, a cyano group or the like, e.g. a chloromethyl group, a trifluoropropyl group, a cyanoethyl group and the like. In order that the film obtained from the composition is imparted with good releasing properties relative to self-adhesives, it is preferred that at least 80% of all R's is made of methyl group.

In the formula (1), a is an integer of 1, 2 or 3. When a is an integer of 2 or 3, A's may be the same or different. b is an integer of 2 or 3. In view of curability, b is preferably a value of 3. n is an integer of 1 or over. Preferably, n is an integer of 10 of over. The organopolysiloxane should have a viscosity ranging from 50 to 2000 cps., at 25° C. This is because when the viscosity at 25° C. is less than 50 cps., the content of the (meth)acrylic group increases with the result that the hardness of the resultant cured film becomes too great. On the other hand, when the viscosity exceeds 2000 cps., the content of the (meth)acrylic group decreases with a lowering of the hardness. Accordingly, the viscosity at 25° C. should range from 50 to 2000 cps.

The organopolysiloxane of the general formula (1) can be readily obtained by reaction between an alkoxy group-containing organopolysiloxane of the following general formula (7)

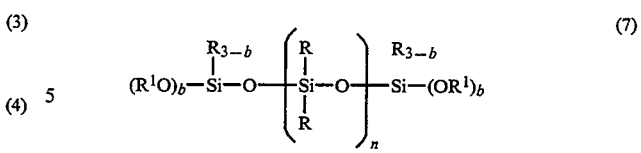 (7)

wherein R, n and b have, respectively, the same meanings as defined before and R$^1$'s may be the same or different and represent a monovalent hydrocarbon group having from 1 to 6 carbon atoms, and a methacrylic or acrylic group-containing silanol of the following formula (8)

 (8)

wherein A and a have, respectively, the same meanings as defined before. The reaction is usually effected at a temperature of room temperature to 120° C. in the presence of a catalyst made of a tin compound of the formula, SnX$_2$, wherein X represents a halogen atom, an alkyl group, an alkoxy group or a carboxyl group. Specific examples of the tin compounds include tin (II) chloride, tin (II) bromide, tin (II) acetate, tin (II) octylate and the like.

Preferably, the organopolysiloxane having the methacrylic or acrylic functional groups and represented by the general formula (1) should have the terminal units of the following formulas (9) to (12)

 (9)

 (10)

 (11)

$[A_3-Si-O]_3-SiO-$ (12)

In the above formulas, A has the same meaning as defined with respect to the formula (1). Preferably, A represents the groups of the afore-indicated formulas (3) to (6). There may be mentioned specific examples of the organopolysiloxane in the following formulas (13) to (17)

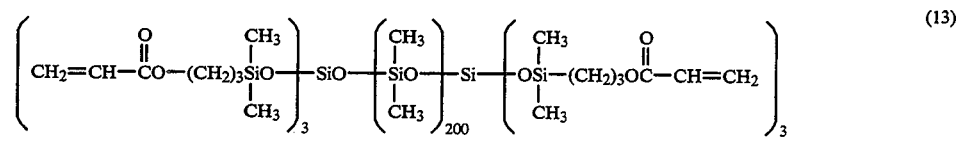 (13)

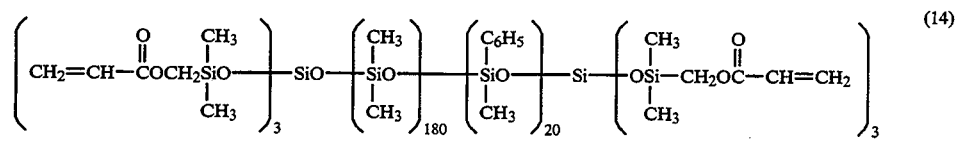 (14)

-continued

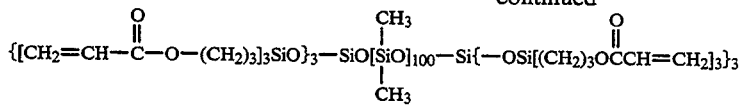

(15)

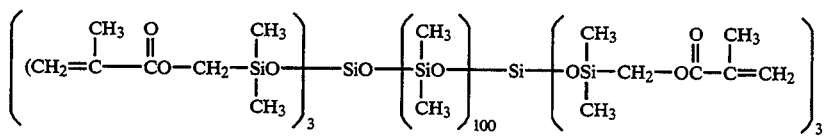

(16)

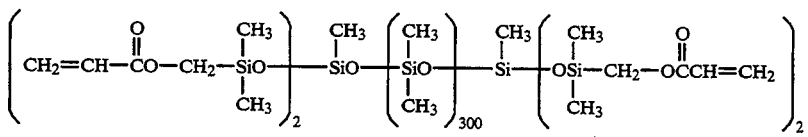

(17)

These organopolysiloxanes may be used singly or in combination.

The silicone composition which comprises or consists essentially of the organopolysiloxane defined hereinabove may be readily formed as a thin film and cured by irradiation of a radiation.

Especially, when UV radiation is used for the curing, a photoinitiator is preferably added to the composition in an amount sufficient for the curing. The amount preferably ranges from 0.1 to 10 wt % based on the organopolysiloxane composition. The photoinitiators may be compounds ordinarily used for this purpose and include, for example, benzophenone, 4-chlorobenzophenone, 4,4'-dimethoxybenzophenone, acetophenone, 4-methylacetophenone, benzoin methyl ether, benzoin trialkylsilyl ethers, 2-hydroxy-2-methyl-1-phenyl-propan-1-one and the like.

The releasing silicone composition of the invention is useful as a release coating for a variety of self-adhesives. In practice, the composition is applied onto supports such as paper sheets, various plastic resin films, metallic foils such as aluminum and the like, by the use of coating techniques using bar coaters, gravure coaters, reverse coaters or the like or by spraying. Usually, the composition is applied in a thickness of 0.01 to 200 μm and cured by exposure to a radiation.

The radiation may be electron beams, α, β and γ rays and UV rays generated from mercury arcs, moderate pressure mercury lamps and high pressure mercury lamps. The dose necessary for curing the film is usually in the range of 2 to 5 Mrad., for electron beams. With UV light, when a 2 KW high pressure mercury lamp (80 W/cm) is employed, it is sufficient to irradiate the UV light at a distance of 8 cm from the film for 0.1 to 10 seconds.

Needless to say, the silicone composition of the invention may further comprise various additives in amounts not impeding the characteristic properties of the composition. The additives include, for example, other types of (meth)acrylic group-containing organopolysiloxanes and other organopolysiloxanes, reactive diluents such as hexanediol acrylate, trimethylolpropane triacrylate and the like, levelling agents, antistatic agents, fillers, pigments and the like, The composition of the invention may be used after dilution with organic solvents such as toluene, xylene, methyl ethyl ketone, methyl isobutyl ketone, 1,4-dioxane and the like.

The present invention is more particularly described by way of synthetic examples and examples wherein parts are by weight and the viscosity is a measurement at 25° C. Comparative examples are also described. The physical values indicated in these examples are determined according to the testing methods set out below.

Curability:

The releasing silicone composition of the invention was coated on a polyethylene laminated paper sheet. Where the coating was cured by application of an electron beam, the curability was expressed in terms of a dose (Mrad.) of the electron beam required to form a completely cured film. On the other hand, when UV radiation was used wherein two 2 KW high pressure mercury lamps (80 W/cm) were used, the curability was expressed in terms of a radiation time (seconds) before a completely cured film was formed by irradiation with the UV light at a distance of 8 cm from the lamps. The complete curing was judged as occurring at the time when the cured film did not drop off and was not clouded on rubbing with a finger.

Release Force:

The releasing silicone composition of the invention was coated on a polyethylene laminated paper sheet and cured by application of a radiation. Thereafter, an acrylic resin-based solvent-type self-adhesive (Oribain BPS-8170, available from Toyo Inks Mfg. Co., Ltd.) was applied onto the cured film surface in an amount of 60 g/m$^2$ as the solid matter and thermally treated at 100° C. for 3 minutes. Then, a paper sheet with a basis weight of 64 g/m$^2$ was set on and bonded to the thus treated surface to provide a sample. The sample was aged at 25° C. for 20 hours and the thus aged sample was cut into pieces with 5 cm in width. The sample pieces were subjected to a tensile tester under conditions of an peeling angle of 180° and a peeling rate of 300 mm/minute thereby determining a force (g/5 cm) necessary for the peeling.

Residual Adhesion Rate:

Like the measurement of the peeling force, the organopolysiloxane composition was coated on a polyethylene laminated paper sheet and cured to form a cured film. Thereafter, a polyester Self-adhesive tape (Lumilar 31B, Nitto Denko K.K.) was attached to the cured film surface of the silicone composition formed on the sheet surface. The attached sample was applied with a load of 20 g/cm$^2$ and thermally treated by application of heat at 70° C. for 20 hours. The thus treated self-adhesive tape was peeled off and attached to a stainless steel sheet. The thus treated tape was peeled off from the stainless steel sheet at an angle of 180° at a peeling rate of 300 mm/minute to determine a force (g/2.5 cm) necessary for the peeling as Force 1.

Similarly, a non-treated polyester self-adhesive tape was attached to a stainless steel sheet to measure a force (g/2.5 cm) necessary for the peeling as Force 2.

The ratio by percent of Force 1 to Force 2 is provided as a residual adhesion rate.

SYNTHETIC EXAMPLE 1

500 g of dimethylpolysiloxane of the following formula blocked with a trimethoxysilyl group at both ends of the molecule chain

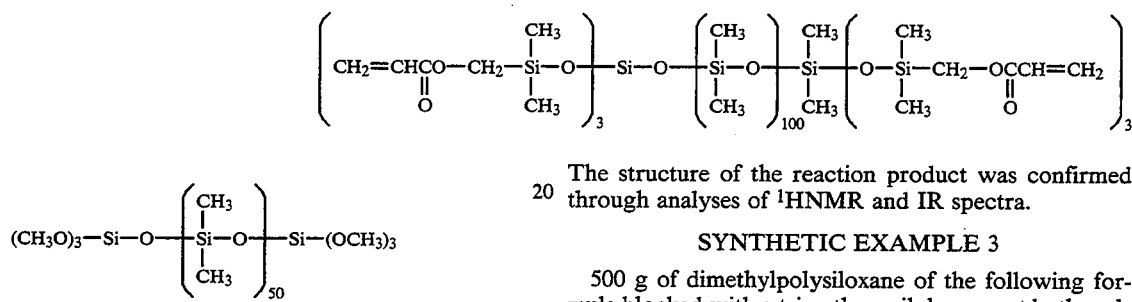

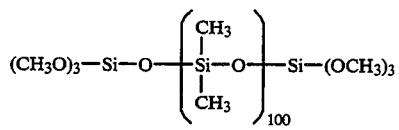

and 0.50 g (1,000 ppm based on the trimethoxysilyl-terminated dimethylpolysiloxane) of dioctyl tin were placed and mixed in a one-liter four neck round bottom flask equipped with a thermometer, a condenser, a dropping funnel and an agitator. 121 g of acryloxymethylsilanol was dropped in the mixture, followed by reaction at room temperature for 48 hours. After completion of the reaction, the resultant methanol by-product was stripped off under conditions of 40° C./5 mmHg, thereby obtaining a colorless, transparent product of the following formula having a viscosity of 300 cps., (hereinafter referred to as Organopolysiloxane I)

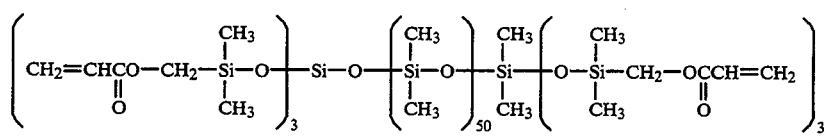

The structure of the reaction product was confirmed through analyses of ¹HNMR and IR spectra.

SYNTHETIC EXAMPLE 2

500 g of dimethylpolysiloxane of the following formula blocked with a trimethoxysilyl group at both ends of the molecule chain placed and mixed in a one-liter four neck round bottom flask equipped with a thermometer, a condenser, a dropping funnel and an agitator. 62.6 g of acryloxymethylsilanol was dropped in the mixture, followed by reaction at room temperature for 48 hours. After completion of the reaction, the resultant methanol by-product was stripped off under conditions of 40° C./5 mmHg, thereby obtaining a colorless, transparent product of the following formula having a viscosity of 800 cps., (hereinafter referred to as Organopolysiloxane II)

The structure of the reaction product was confirmed through analyses of ¹HNMR and IR spectra.

SYNTHETIC EXAMPLE 3

500 g of dimethylpolysiloxane of the following formula blocked with a trimethoxysilyl group at both ends of the molecule chain

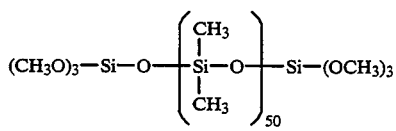

and 0.50 g (1,000 ppm based on the trimethoxysilyl-terminated dimethylpolysiloxane) and dioctyl tin were placed and mixed in a one-liter four neck round bottom flask equipped with a thermometer, a condenser, a dropping funnel and an agitator. 40.3 g of acryloxymethylsilanol was dropped in the mixture, followed by reaction at room temperature for 48 hours. After completion of the reaction, the resultant methanol by-product was stripped off under conditions of 40° C./5 mmHg, thereby obtaining a colorless, transparent product of the following formula having a viscosity of 750 cps., (hereinafter referred to as Organopolysiloxane III)

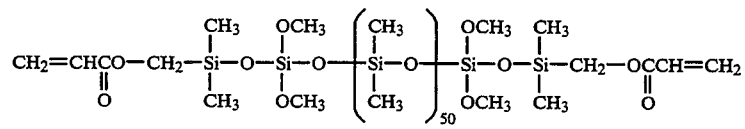

and 0.50 g (1,000 ppm based on the trimethoxysilyl-terminated dimethylpolysiloxane) and dioctyl tin were The structure of the reaction product was confirmed through analyses of ¹HNMR and IR spectra.

SYNTHETIC EXAMPLE 4

17.9 g of hexamethyldisiloxane, 408 g of octamethylcyclotetrasiloxane, and 114 g of acryl group-containing cyclosiloxane of the following formula

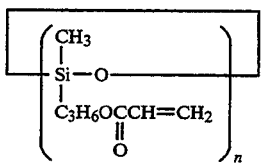

were placed and mixed in a one-liter four neck round bottom flask equipped with a thermometer, a condenser, a dropping funnel and an agitator. Thereafter, 1.1 g of trifluoromethanesulfonic acid was added to the mixture for reaction at 80° to 90° C. for 6 hours. After completion of the reaction, the resultant product was cooled down to room temperature, to which 2.2 g of triethylamine was added. The mixture was agitated for 4 hours and subjected to stripping under conditions of 110° C./4 mmHg and filtration. As a result, there was obtained product of the following formula having a viscosity of 110 cps., (hereinafter referred to as Organopolysiloxane IV)

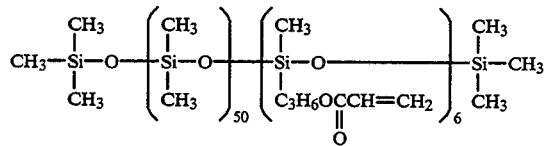

The structure of the reaction product was confirmed through analyses of $^1$HNMR and IR spectra.

EXAMPLES 1, 2 AND COMPARATIVE EXAMPLES 1, 2

The organopolysiloxanes I to IV, respectively, obtained in Synthetic Examples 1 to 4 were each applied onto a polyethylene-laminated paper sheet in a thickness of 1 μm, followed by curing by application of an electron beam. The curability and the release characteristics of the resultant individual cured films were determined. The results are shown in Table 1 below.

TABLE 1

| Sample | Organopolysiloxane | Curability (seconds) | Release Force (g/5 cm) | Residual Adhesion Rate (%) |
|---|---|---|---|---|
| Example 1 | I | 2 | 70 | 98 |
| 2 | II | 3 | 55 | 97 |
| Comp. Ex. 1 | III | 5 | 320 | 78 |
| 2 | IV | 2 | 150 | 98 |

EXAMPLE 3, 4 AND COMPARATIVE EXAMPLES 3, 4

Organopolysiloxanes I to IV, respectively, obtained in Synthetic Examples 1 to 4 were each mixed with 5 wt % of a benzoin isobutyl ether photoinitiator. Each mixture was applied onto a polyethylene-laminated paper sheet in a thickness of 2 μm, followed by curing by application of two 2 KW high pressure mercury Lamps (80 W/cm) at a distance of 8 cm from the film. The curability and the release characteristics of the cured film were determined. The results are shown in Table 2 below.

TABLE 2

| Sample | Organopolysiloxane | Curability (seconds) | Release Force (g/5 cm) | Residual Adhesion Rate (%) |
|---|---|---|---|---|
| Example 3 | I | 2.4 | 65 | 94 |
| 4 | II | 4.0 | 50 | 93 |
| Comp. Ex. 3 | III | 6.4 | 250 | 72 |
| 4 | IV | 3.2 | 130 | 92 |

What is claimed is:

1. A radiation-curable releasing silicone composition consisting essentially of an organopolysiloxane having methacrylic or acrylic functionality and represented by the following general formula:

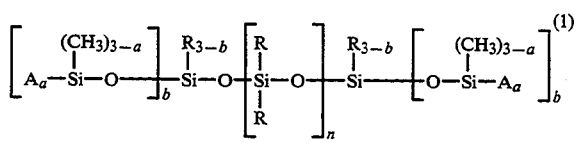

wherein A represents a monovalent hydrocarbon group having a methacrylic or acrylic moiety and having from 4 to 10 carbon atoms, R's independently represent an unsubstituted or substituted monovalent organic group, a is an integer of 1, 2 or 3, b is an integer of 2 or 3, and n is an integer of 1 or over, said organopolysiloxane having a viscosity of from 50 to 2,000 cps., at 25° C., whereby when cured, the resultant cured product has good release properties against self-adhesives.

2. The silicone composition according to claim 1, wherein b is an integer of 3.

3. The silicone composition according to claim 1, wherein at least 80% of the total R's in the formula is made of a methyl group.

4. The silicone composition according to claim 1, wherein n is a value of up to several hundreds.

5. The silicone composition according to claim 1, wherein A represents a monovalent hydrocarbon group of the formula

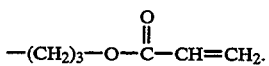

6. The silicone composition according to claim 1, wherein A represents a monovalent hydrocarbon group of the formula

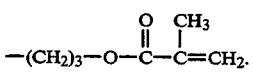

7. The silicone composition according to claim 1, wherein A represents a monovalent hydrocarbon group of the formula

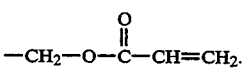

8. The silicone composition according to claim 1, wherein A represents a monovalent hydrocarbon group of the formula

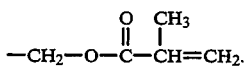

9. The silicone composition according to claim 1, wherein said organopolysiloxane has a terminal unit of the following formula

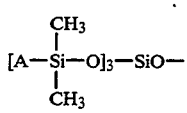 (9)

wherein A has the same meaning as defined in claim 1.

10. The silicone composition according to claim 9, wherein A represents a monovalent hydrocarbon group of the formula

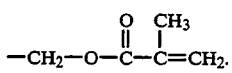

11. The silicone composition according to claim 9, wherein A represents a monovalent hydrocarbon group of the formula

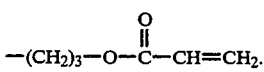

12. The silicone composition according to claim 9, wherein A represents a monovalent hydrocarbon group of the formula

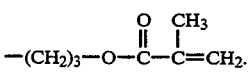

13. The silicone composition according to claim 9, wherein A represents a monovalent hydrocarbon group of the formula

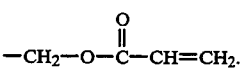

14. The silicone composition according to claim 1, wherein said organopolysiloxane has a terminal unit of the following formula

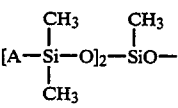

wherein A has the same meaning as defined in claim 1.

15. The silicone composition according to claim 14, wherein A represents a monovalent hydrocarbon group of the formula

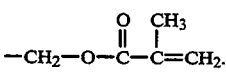

16. The silicone composition according to claim 14, wherein A represents a monovalent hydrocarbon group of the formula

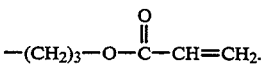

17. The silicone composition according to claim 14, wherein A represents a monovalent hydrocarbon group of the formula

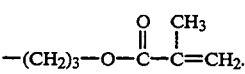

18. The silicone composition according to claim 14, wherein A represents a monovalent hydrocarbon group of the formula

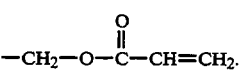

19. The silicone composition according to claim 1, wherein said organopolysiloxane has a terminal unit of the following formula

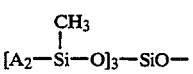

wherein A has the same meaning as defined in claim 1.

20. The silicone composition according to claim 19, wherein A represents a monovalent hydrocarbon group of the formula

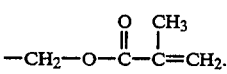

21. The silicone composition according to claim 19, wherein A represents a monovalent hydrocarbon group of the formula

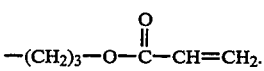

22. The silicone composition according to claim 19, wherein A represents a monovalent hydrocarbon group of the formula

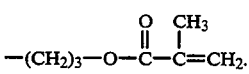

23. The silicone composition according to claim 19, wherein A represents a monovalent hydrocarbon group of the formula

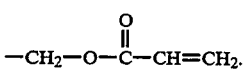

24. The silicone composition according to claim 1, wherein said organopolysiloxane has a terminal unit of the following formula

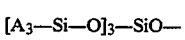

wherein A has the same meaning as defined in claim 1.

25. The silicone composition according to claim 24, wherein A represents a monovalent hydrocarbon group of the formula

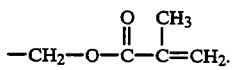

26. The silicone composition according to claim 24, wherein A represents a monovalent hydrocarbon group of the formula

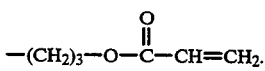

27. The silicone composition according to claim 24, wherein A represents a monovalent hydrocarbon group of the formula

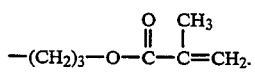

28. The silicone composition according to claim 24, wherein A represents a monovalent hydrocarbon group of the formula

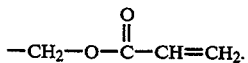

29. The silicone composition according to claim 1, which also contains a photoinitiator in an amount of 0.1 to 10 wt % based on said organopolysiloxane.

30. A cured product obtained from the composition of claim 1.

* * * * *